(12) United States Patent
Yamasaki et al.

(10) Patent No.: US 6,970,404 B2
(45) Date of Patent: Nov. 29, 2005

(54) INFORMATION RECORDING/REPRODUCING APPARATUS

(75) Inventors: Fumitomo Yamasaki, Nara (JP); Hideki Aikoh, Osaka (JP); Akihiro Arai, Kyoto (JP); Tohru Nakamura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 645 days.

(21) Appl. No.: 09/972,701

(22) Filed: Oct. 5, 2001

(65) Prior Publication Data

US 2002/0041545 A1 Apr. 11, 2002

(30) Foreign Application Priority Data

Oct. 5, 2000 (JP) .............................. 2000-305817

(51) Int. Cl.[7] .............................................. G11B 7/00
(52) U.S. Cl. .............................. 369/44.32; 369/44.29; 369/53.19
(58) Field of Search .................... 369/44.32, 53.19, 369/44.29, 44.35

(56) References Cited

U.S. PATENT DOCUMENTS 5,978,332 A * 11/1999 Itakura et al. ........... 369/44.32
6,363,039 B2 * 3/2002 Hayashi et al. .......... 369/44.32
6,549,493 B1 * 4/2003 Nakamura et al. ....... 369/44.32

FOREIGN PATENT DOCUMENTS

| JP | 7-182691 | 7/1995 |
| JP | 2000-132855 | 5/2000 |

* cited by examiner

Primary Examiner—Thang V. Tran
(74) Attorney, Agent, or Firm—Hamre, Schumann, Mueller & Larson, P.C.

(57) ABSTRACT

An information recording/reproducing apparatus includes a focusing optical system for focusing light from a light source on an information recording medium as a light spot and an error signal generation system for generating an error signal that represents the positional deviation between an information track and the light spot on the information recording medium from the light reflected by the information recording medium. The apparatus further includes a tilt measurement system for measuring the amount of relative inclination between the focusing optical system and the information recording medium and an offset application system for performing off-track of the light spot by applying an electric offset corresponding to the measured amount of inclination to the error signal. Since the electric offset that corresponds to the amount of inclination is added directly to the error signal, the apparatus does not require a complicated algorithm and can improve the recording and reproduction characteristics easily at low cost.

13 Claims, 16 Drawing Sheets

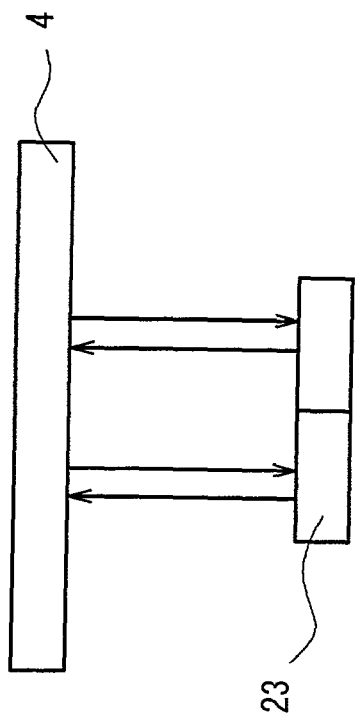
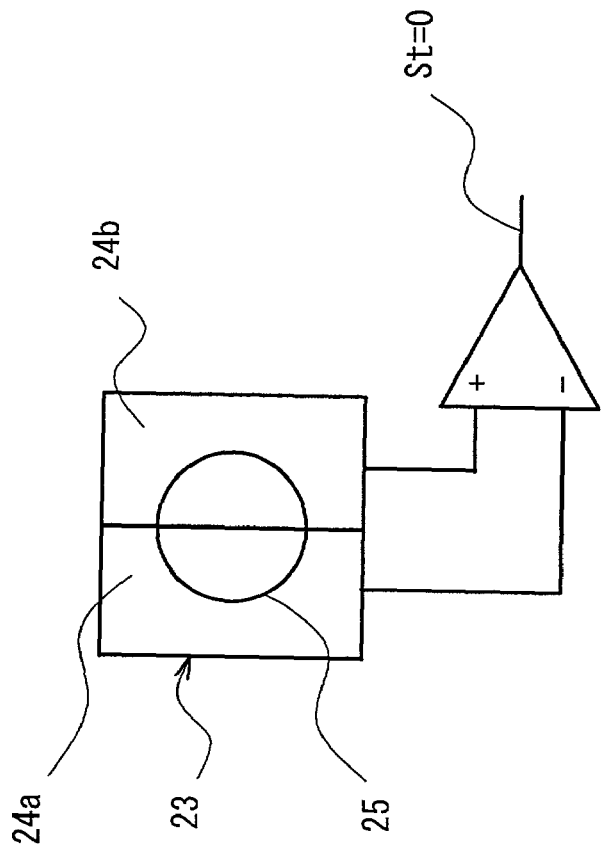
FIG. 2A
FIG. 2B

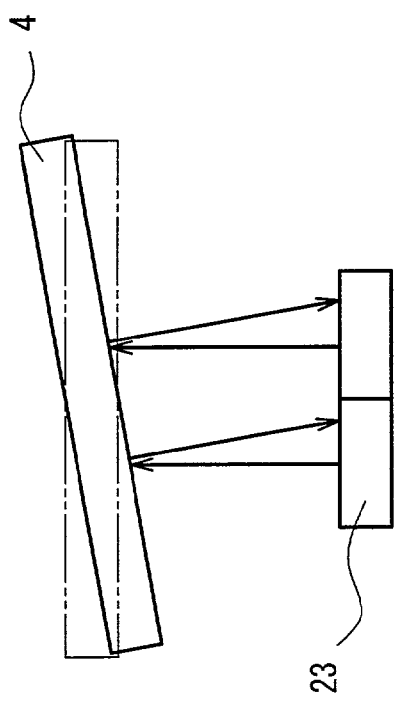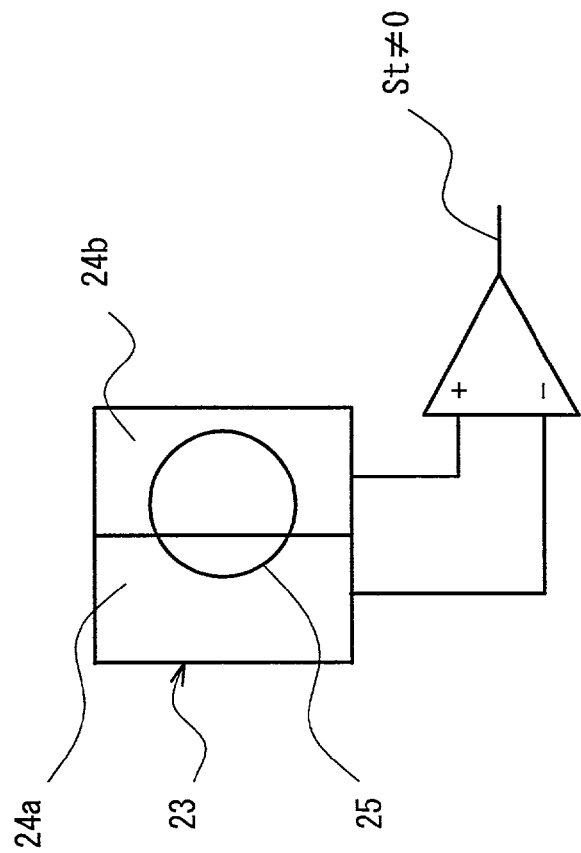
F I G. 3A
F I G. 3B

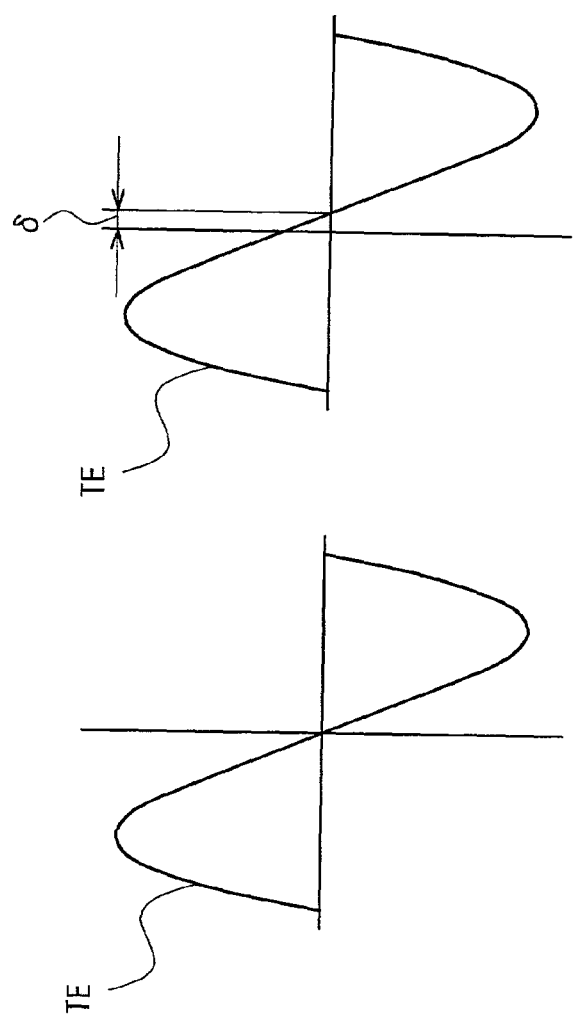
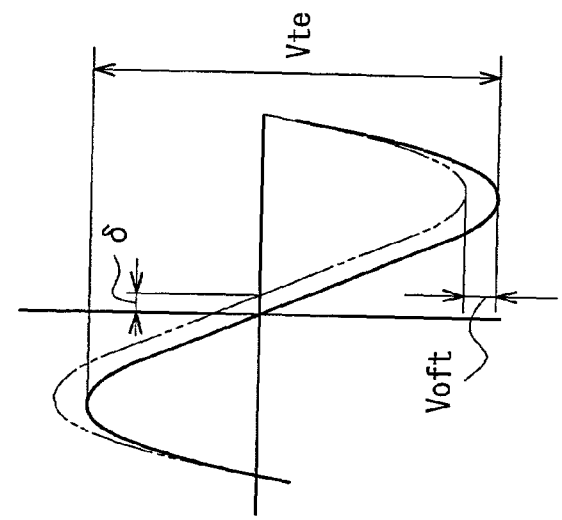
FIG. 4A
FIG. 4B
FIG. 4C

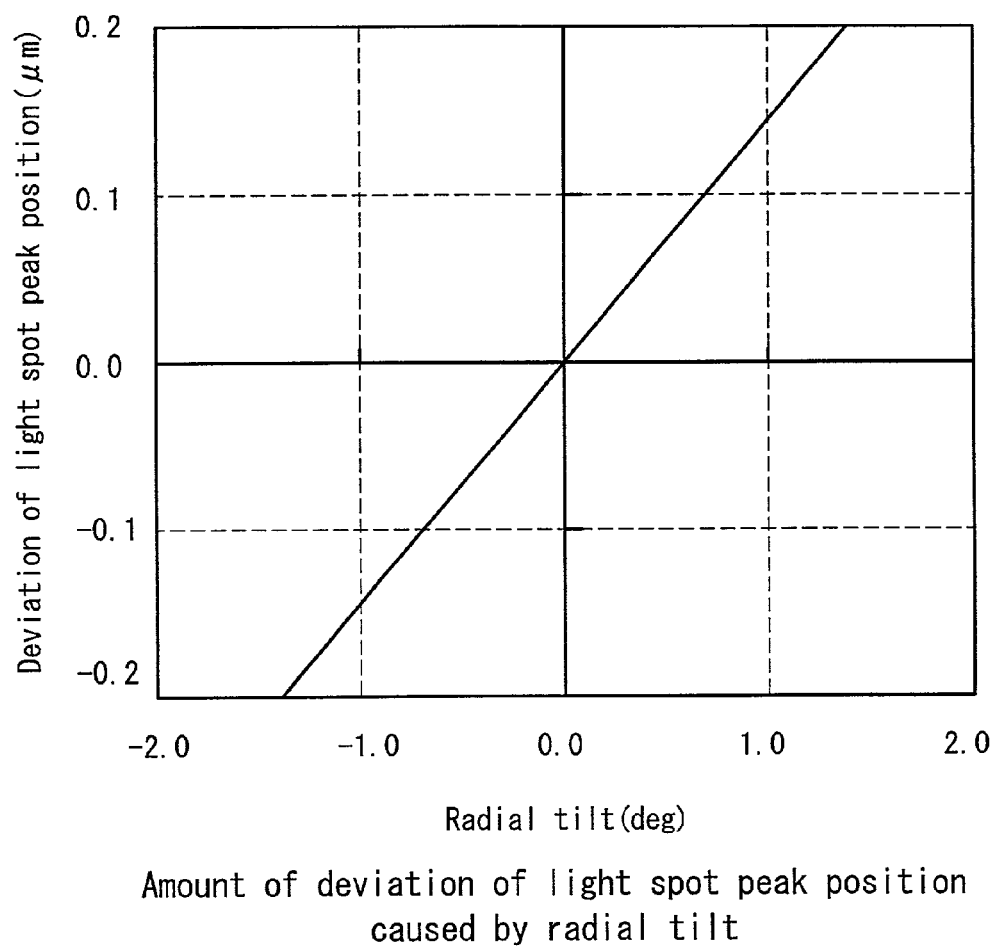
Amount of deviation of light spot peak position caused by radial tilt
F I G. 5

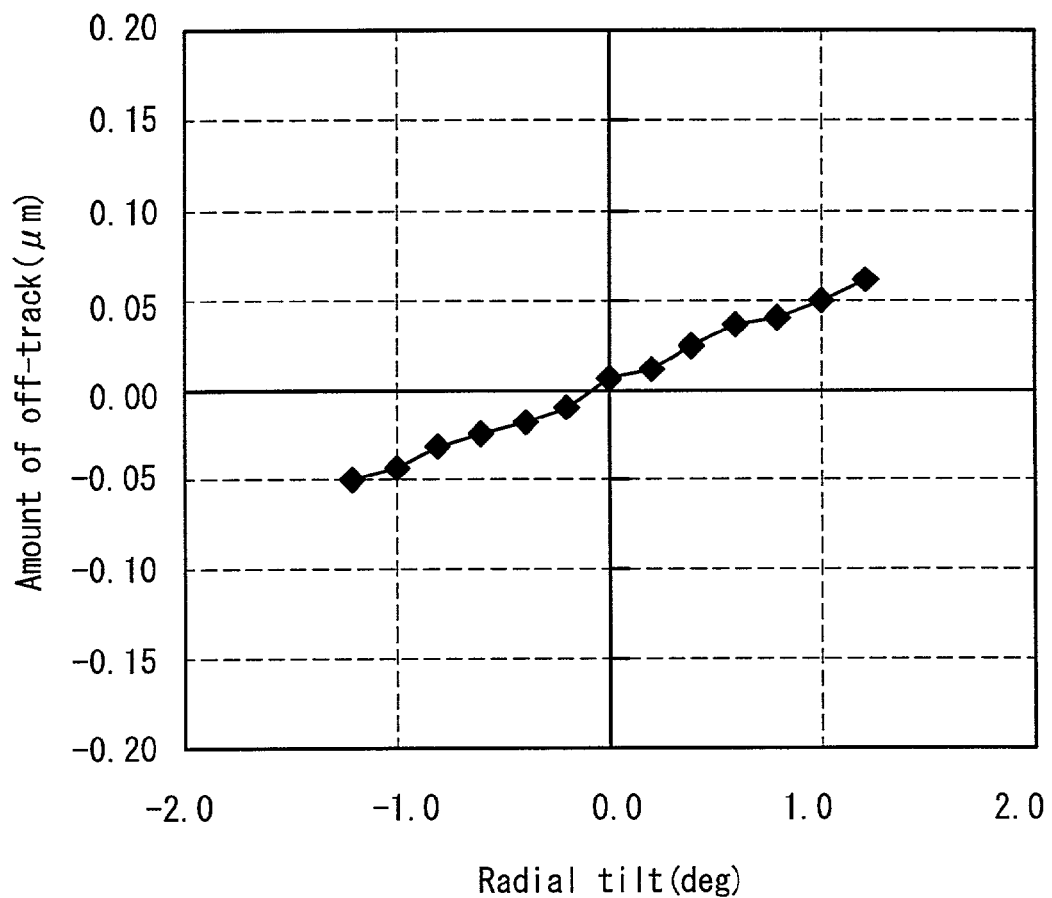
Amount of off-track required to minimize reproduction jitter in case of radial tilt
F I G. 6

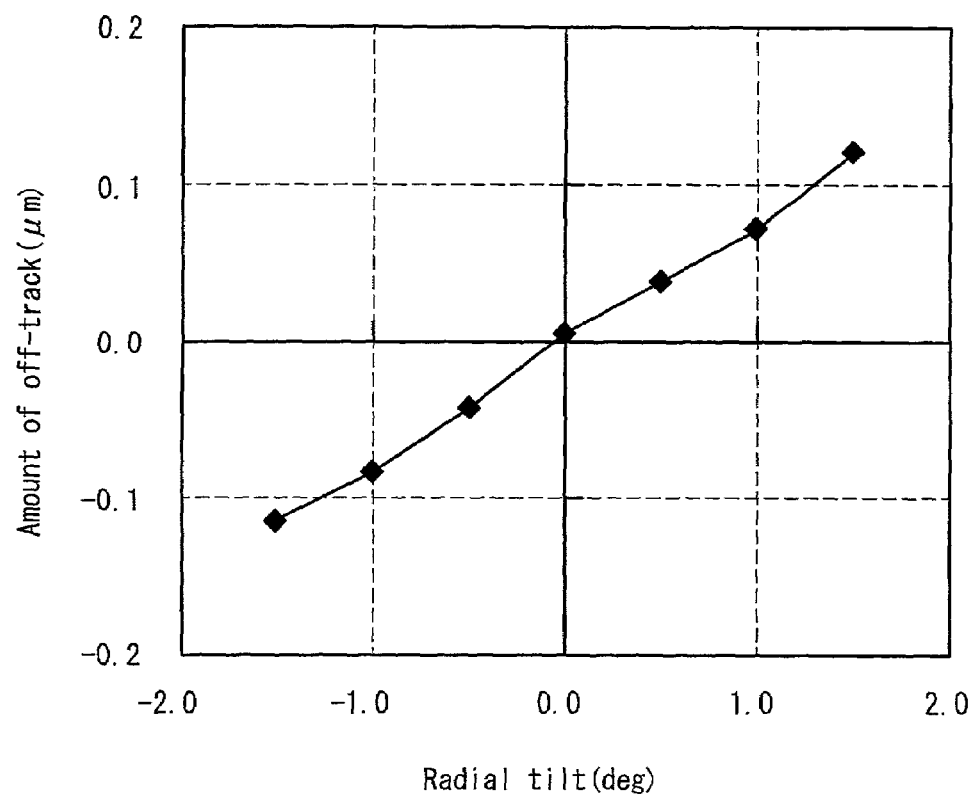
Amount of off-track required to minimize cross erase in case of radial tilt
F I G. 7

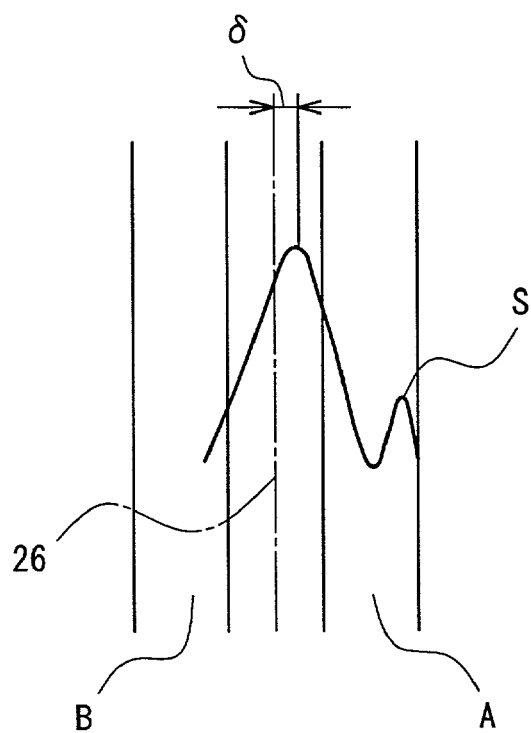
F I G. 9 A
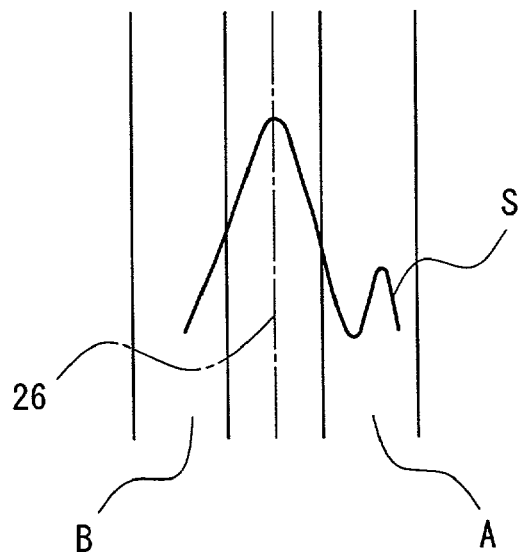
F I G. 9 B

Tracking error signal at a radial tilt of 1.0 deg for different groove widths

Tracking error signal at a radial tilt of 1.0 deg for different groove depths

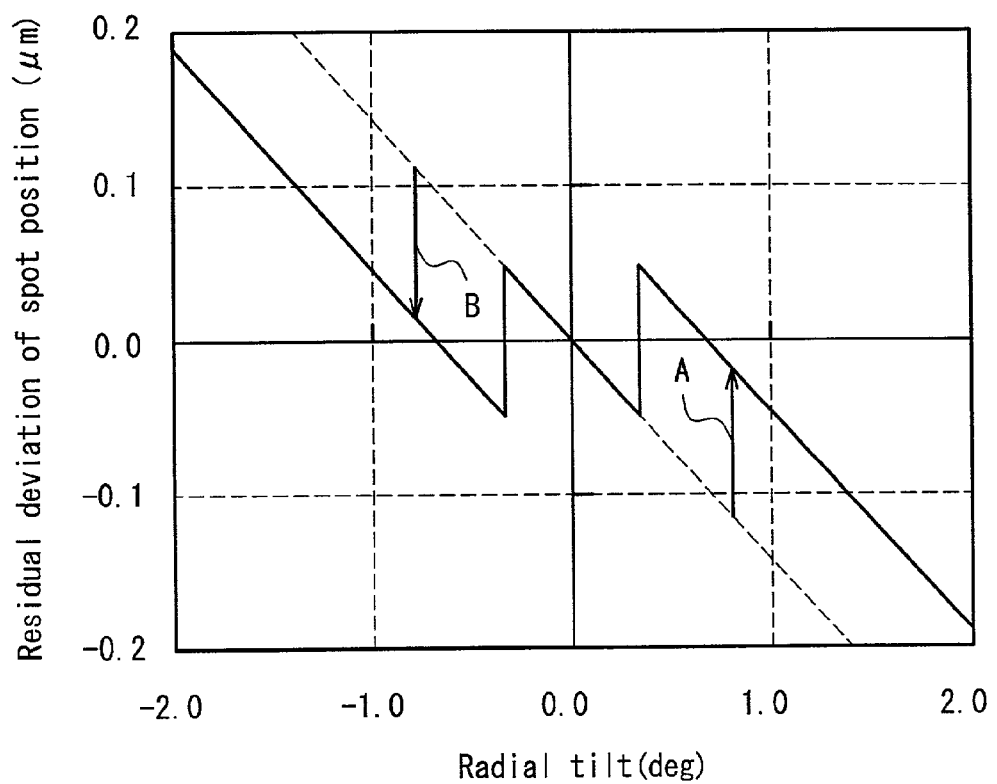
F I G. 14

INFORMATION RECORDING/REPRODUCING APPARATUS

BACKGROUND OF THE INVENTION

1. Field of the Invention

The present invention relates to an information recording/reproducing apparatus for recording and/or reproducing information on an information recording medium having information tracks by using a light spot.

2. Description of the Related Art

Information recording media using a laser beam (hereinafter, referred to as optical disks) are utilized widely in various fields. An optical disk has a substrate and a recording layer formed on the substrate. A laser beam emitted from a semiconductor laser is focused on the recording layer through an objective lens. A mark is formed on the recording layer by this laser beam irradiation, so that information is recorded. Also, the information is reproduced by reflected light from the mark.

Recently, there have been demands in such optical disks for higher density of the information to be recorded.

The recording density of an optical disk can be increased by reducing a space between the information tracks on the optical disk (hereinafter, referred to as a track pitch). However, this gives rise to problems when a tracking servo mechanism is employed. The tracking servo mechanism, like a push-pull method and a sample servo method, utilizes a difference in the amount of reflected light in the radial direction of the optical disk. When a relative inclination between the objective lens and the optical disk occurs, coma aberration deteriorates a light spot. Here, such inclination is referred to as "tilt," and particularly a tilt in the radial direction is called "radial tilt." Moreover, the zero-cross point of a tracking error signal, which is used for tracking control, deviates from the center of an information track, and thus the peak position of the light spot deviates from the information track center. The deterioration of the light spot and the deviation between the information track and the light spot peak position cause so-called cross erase and cross talk, particularly when a track pitch is small, which is responsible for the degradation of recording and reproduction characteristics. The cross erase is such that signals in the adjacent information track or tracks are overwritten during recording, while the cross talk is such that signals in the adjacent information track or tracks are reproduced during reproduction.

In view of this, for an information recording/reproducing apparatus (hereinafter referred to as an optical disk apparatus) that allows information to be recorded/reproduced on an optical disk with high density, it has been proposed to improve the recording and reproduction characteristics in such a manner that cross erase and cross talk due to a radial tilt are reduced by offsetting a light spot to the predetermined position of an information track, which is so-called off-track.

JP 07(1995)-182691 A discloses an information recording/reproducing apparatus that improves the recording and reproduction characteristics by off-track.

FIG. 15 shows the configuration of a conventional information recording/reproducing apparatus, including a semiconductor laser 101, a polarizing beam splitter 102, an objective lens 103, an optical disk 104, a recording layer 105, a photodetector 106, an objective lens actuator 107, an arithmetic circuit 111, an offset application circuit 112, a servo circuit 113, and the like.

The reproducing operation of an information recording/reproducing apparatus having the above configuration will be described below.

A laser beam emitted from the semiconductor laser 101 passes through the polarizing beam splitter 102, enters the objective lens 103, and is focused on the recording layer 105 of the optical disk 104 to form a light spot. The laser beam reflected from the recording layer 105 returns to the objective lens 103 and enters the polarizing beam splitter 102. Depending on the polarization direction, the optical path of the laser beam is divided by reflection from the polarizing beam splitter 102, thus entering the photodetector 106.

The photodetector 106 converts the incident laser beam photoelectrically, and the arithmetic circuit 111 generates a focus error signal and a tracking error signal. The servo circuit 113 drives the objective lens actuator 107 to follow the surface vibration and eccentricity of the optical disk 104 using the focus error signal and the tracking error signal, respectively.

When the relative inclination between the objective lens 103 and the optical disk 104 in the radial direction occurs, i.e., a radial tilt occurs, the light spot peak position deviates, and coma aberration is caused in the light spot on the optical disk 104. This leads to cross talk, in which signals in the adjacent information track or tracks are reproduced during signal reproduction. To reduce the cross talk, the offset application circuit 112 applies an electric offset to a tracking error signal so as to perform off-track that shifts the light spot peak position to about the center of an information track.

The procedure for determining the amount of off-track of a light spot will be described below.

A predetermined information track on the optical disk 104 is designated as an Nth track. The adjacent track located inside of the Nth track, i.e., (N−1)th track, is reproduced, and at that time the amplitude of a signal recorded on the Nth information track (hereinafter, referred to as the amount of cross talk) is detected. Also, the adjacent track located outside of the Nth track, i.e., (N+1)th track, is reproduced, and at that time the amount of cross talk from the Nth information track is detected.

Next, a difference between the two amounts of cross talk is detected to make a judgment whether the resultant value is a minimum. When the value is not a minimum, the offset application circuit 112 applies an electric offset to a tracking error signal so as to perform off-track of the light spot, and then the above operation is repeated until the amount of off-track required to minimize the difference is found.

The amount of off-track thus found is stored, and thereafter off-track is performed by applying an electric offset corresponding to this off-track amount to a tracking error signal. As a result, the peak position of a light spot can be shifted to about the center of an information track, thereby improving the reproduction characteristics.

JP 2000-132855 A discloses another information recording/reproducing apparatus that improves the recording and reproduction characteristics by off-track.

FIG. 16 shows the configuration of another conventional information recording/reproducing apparatus, including a semiconductor laser 101, a polarizing beam splitter 102, an objective lens 103, an optical disk 104, a recording layer 105, a photodetector 106, an objective lens actuator 107, an arithmetic circuit 111, an offset application circuit 112, a servo circuit 113, a CPU 114, and the like. In FIG. 16, the identical elements to those in FIG. 15 are denoted by the same reference numerals, and the detailed description thereof will be omitted.

The procedure for determining the amount of off-track of a light spot will be described below.

A laser beam entering the photodetector 106 is converted photoelectrically, calculated with the arithmetic circuit 111, and detected as reproduction jitter with the CPU 114. When the CPU 114 judges the detected reproduction jitter to be worse than a predetermined comparative value, the offset application circuit 112 applies a predetermined electric offset to a tracking error signal based on the instruction of the CPU 114. Consequently, off-track is performed that shifts a light spot peak position to about the center of an information track. The optimum amount of off-track is determined, e.g., by repeating off-track until the reproduction jitter detected by the CPU 114 is optimized. Alternatively, the same effect can be obtained by detecting an error rate and repeating off-track until the error rate is optimized.

The same effect also can be obtained, e.g., by detecting the reproduced signal amplitude with a reproduced signal amplitude detector (not shown) and repeating off-track until the reproduced signal amplitude is maximized.

Using these means, the peak position of a light spot can be shifted to about the center of an information track, thereby improving the reproduction characteristics.

In the above conventional examples, the procedures for improving reproduction characteristics have been described. However, shifting the peak position of a light spot to about the center of an information track reduces cross erase as well, so that the recording characteristics can be improved.

However, in the above configurations, off-track is repeated so that a difference in the amount of cross talk between two adjacent tracks is minimized, the reproduction jitter or error rate is optimized, or the reproduction signal amplitude is maximized. Therefore, each configuration requires a complicated algorithm, which increases the size of a circuit. Moreover, there is the problem that it takes time to start actual recording or reproduction.

SUMMARY OF THE INVENTION

Therefore, with the foregoing in mind, it is an object of the present invention to provide an information recording/reproducing apparatus that can improve the recording and reproduction characteristics easily at low cost without requiring a complicated algorithm in performing off-track.

To achieve the above object, an information recording/reproducing apparatus of the present invention includes the following: a light source; a focusing optical system for focusing light emitted from the light source on an information recording medium as a light spot; an error signal generation system for generating an error signal that represents the positional deviation between an information track and the light spot on the information recording medium by converting light reflected from the information recording medium into an electric signal; a control system for controlling the light spot to follow the information track by using the error signal; a tilt measurement system for measuring the relative inclination between the information recording medium and the focusing optical system; and an offset application system for shifting the light spot with respect to the information track in accordance with a signal from the tilt measurement system.

According to the information recording/reproducing apparatus of the present invention, a light spot position is off-track with respect to an information track in accordance with the amount of tilt detected by the tilt measurement system. Therefore, the apparatus does not require a complicated algorithm and can improve the recording and reproduction characteristics easily at low cost.

In the information recording/reproducing apparatus of the present invention, it is preferable that the amount of the shift of the light spot by the offset application system is smaller than that of the positional deviation between the information track and the light spot caused by the relative inclination between the information recording medium and the focusing optical system.

In the information recording/reproducing apparatus of the present invention, it is preferable that the offset application system generates an electric offset by multiplying an electric signal from the tilt measurement system that corresponds to the relative inclination between the information recording medium and the focusing optical system by a predetermined constant, and shifts the light spot with respect to the information track by applying the electric offset to the error signal.

In the information recording/reproducing apparatus of the present invention, it is preferable that the offset application system selects any of a plurality of predetermined electric offsets in accordance with an electric signal from the tilt measurement system that corresponds to the relative inclination between the information recording medium and the focusing optical system, and shifts the light spot with respect to the information track by applying the selected electric offset to the error signal.

In the information recording/reproducing apparatus of the present invention, it is preferable that the offset application system corrects variations in the information recording medium by measuring the amplitude of the error signal and correcting a signal from the tilt measurement system so that the ratio of the signal from the tilt measurement system to the amplitude of the error signal is constant.

At this time, it is preferable that the offset application system corrects the groove depth variation of the information recording medium by correcting the asymmetry of the error signal by application of an electric offset corresponding to the asymmetry to the error signal.

In the information recording/reproducing apparatus of the present invention, it is preferable that the offset application system distinguishes between reproducing and recording operations on the information recording medium, and changes the amount of shift of the light spot with respect to the information track based on the distinction.

In the information recording/reproducing apparatus of the present invention, it is preferable that the offset application system distinguishes between a reproducing operation for lands of the information recording medium and that for grooves thereof, and changes the amount of shift of the light spot with respect to the information track based on the distinction.

In the information recording/reproducing apparatus of the present invention, it is preferable that the offset application system distinguishes between a recording operation for lands of the information recording medium and that for grooves thereof, and changes the amount of shift of the light spot with respect to the information track based on the distinction.

These and other advantages of the present invention will become apparent to those skilled in the art upon reading and understanding the following detailed description with reference to the accompanying figures.

BRIEF DESCRIPTION OF THE DRAWINGS

FIGS. 2A and 2B illustrate the operation of a tilt detecting portion of the information recording/reproducing apparatus in FIG. 1. FIG. 2A is a side view in the state where no radial tilt occurs. FIG. 2B is a plan view showing a photodetector with light incident thereon in that case.

FIGS. 3A and 3B illustrate the operation of a tilt detecting portion of the information recording/reproducing apparatus in FIG. 1. FIG. 3A is a side view in the state where a radial tilt occurs. FIG. 3B is a plan view showing a photodetector with light incident thereon in that case.

FIGS. 4A to 4C illustrate a change in a tracking error signal and electric offset correction when a radial tilt occurs in the information recording/reproducing apparatus in FIG. 1. FIG. 4A shows a tracking error signal when no radial tilt occurs. FIG. 4B shows a tracking error signal when a radial tilt occurs. FIG. 4C shows a tracking error signal that is corrected by application of an electric offset.

FIG. 5 shows the relationship between a radial tilt and calculation of the amount of deviation of a light spot peak position from the center of an information track caused by the radial tilt in an embodiment of the present invention.

FIG. 6 shows the relationship between the amount of radial tilt and measured values of the amount of off-track required to minimize reproduction jitter in an embodiment of the present invention.

FIG. 7 shows the relationship between the amount of radial tilt and measured values of the amount of off-track required to minimize cross erase in an embodiment of the present invention.

FIG. 9A schematically shows the relationship between information tracks and the light intensity distribution of a light spot when a radial tilt occurs.

FIG. 9B schematically shows the relationship between information tracks and the light intensity distribution of a light spot in the state where the light spot position is corrected (off-track) so that the light spot peak position matches the centerline of an information track.

FIG. 14 shows residual deviation of a light spot peak position after off-track correction in the case of a radial tilt in an embodiment of the present invention.

DESCRIPTION OF THE PREFERRED EMBODIMENTS

Hereinafter, embodiments of the present invention will be described with reference to FIGS. 1 to 14.

Figure 1:
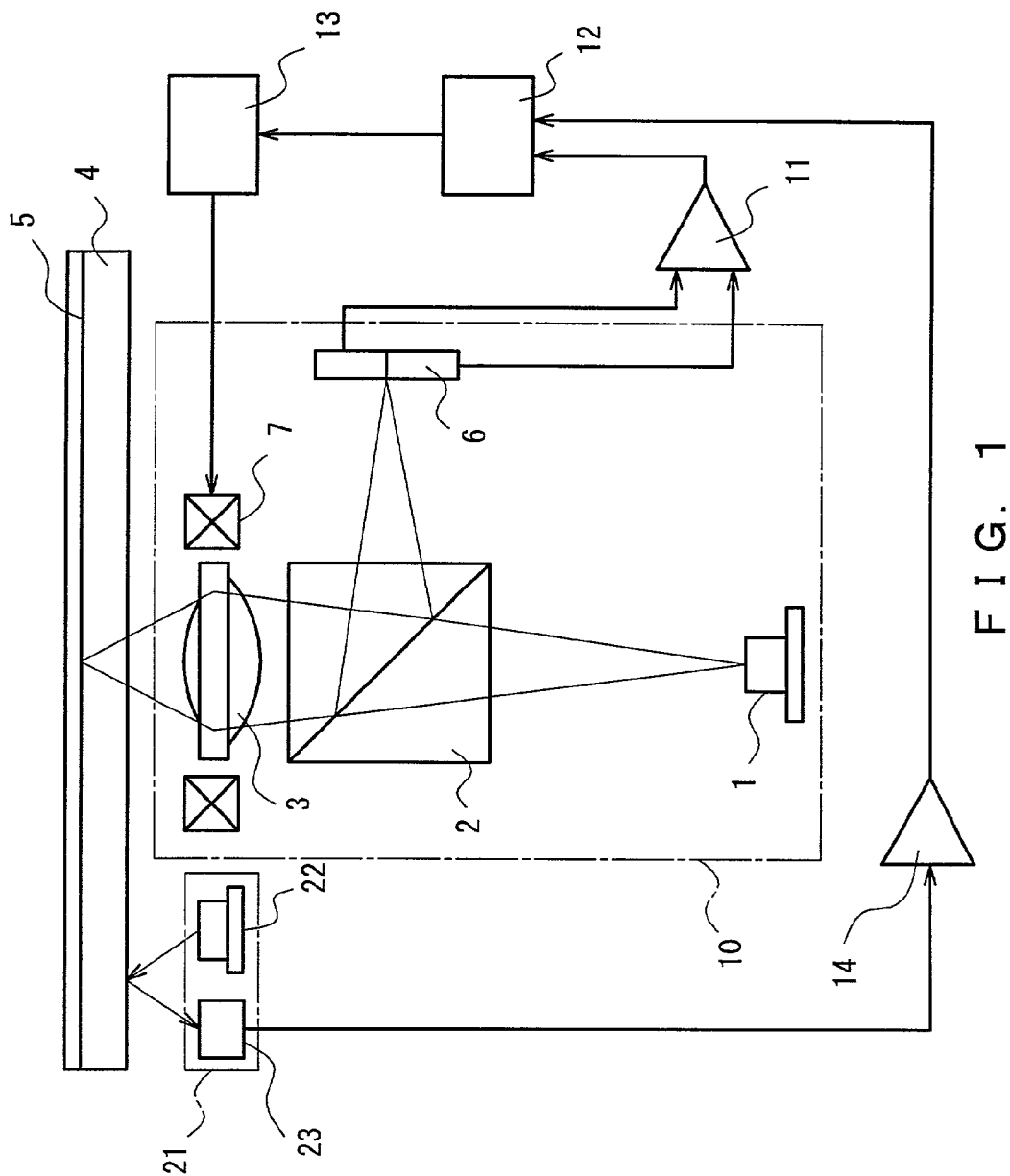
FIG. 1 shows a schematic configuration of an information recording/reproducing apparatus of an embodiment of the present invention.

FIG. 1 shows the schematic configuration of an information recording/reproducing apparatus (an optical disk apparatus) of an embodiment of the present invention. In FIG. 1, reference numeral 10 is an optical head, 1 is a semiconductor laser (light source), 2 is a polarizing beam splitter, 3 is an objective lens, 4 is an optical disk, 5 is a recording layer, 6 is a photodetector, and 7 is an objective lens actuator. Moreover, reference numeral 11 is an arithmetic circuit, 12 is an offset application circuit, 13 is a servo circuit, and 14 is an arithmetic circuit. Further, reference numeral 21 is a tilt detecting portion, 22 is a light source, and 23 is a photodetector.

The operation of the optical head 10 in the optical disk apparatus having the above configuration will be described.

A laser beam emitted from the semiconductor laser 1 passes through the polarizing beam splitter 2, enters the objective lens 3, and is focused on the recording layer 5 of the optical disk 4 to form a light spot. The laser beam reflected from the recording layer 5 returns to the objective lens 3 and enters the polarizing beam splitter 2. Depending on the polarization direction, the optical path of the laser beam is divided by reflection from the polarizing beam splitter 2, thus entering the photodetector 6.

The photodetector 6 converts the incident laser beam photoelectrically and outputs electric signals, each of which is proportional to the amount of light entering the corresponding light receiving region in the photodetector 6. The arithmetic circuit 11 performs a predetermined calculation for the electric signals and generates a focus error signal and a tracking error signal. The servo circuit 13 drives the objective lens actuator 7 to follow the surface vibration and eccentricity of the optical disk 4 using the focus error signal and the tracking error signal, respectively.

Next, the operation of the tilt detecting portion 21 will be described with reference to FIGS. 2A, 2B, 3A, and 3B. FIGS. 2A and 2B show the state where no radial tilt occurs. FIGS. 3A and 3B show the state where a radial tilt occurs.

As shown in FIG. 2A, light emitted from the light source 22 (not shown in FIG. 2A) is reflected from a mirror portion (where an information track or a recording pit is not formed) of the optical disk 4 and enters the photodetector 23. FIG. 2B is a plan view of the photodetector 23 in FIG. 2A and also shows a block circuit diagram. As shown in FIG. 2B, the photodetector 23 includes two light detecting regions 24a, 24b divided in the radial direction of the optical disk 4. Reference numeral 25 is a light spot formed on the photodetector 23 by reflected light from the optical disk 4. When the optical disk 4 is not inclined in the radial direction relative to the optical head, the amount of light entering the light detecting regions 24a, 24b is adjusted to be equal, as shown in FIG. 2B. Therefore, a signal St is zero, which is obtained by differential calculation between the electric signals output from the respective light detecting regions 24a, 24b after photoelectric conversion.

When the optical disk 4 is inclined in the radial direction relative to the optical head as shown in FIG. 3A, there is a difference in the amount of light entering the light detecting regions 24a, 24b, as shown in FIG. 3B. Therefore, a signal St, which is obtained by differential calculation between the electric signals output from the respective light detecting regions 24a, 24b after photoelectric conversion, is not zero and corresponds to the amount of tilt. The tilt detection using reflected light from the mirror portion of the optical disk 4 can provide a substantially linear electric signal with respect to the amount of tilt.

Next, an example of a system for reducing cross talk and cross erase caused by a radial tilt and improving the recording and reproduction characteristics will be described with a specific numerical example.

In the optical head 10 shown in FIG. 1, the objective lens 3 has a numerical aperture (NA) of 0.6, the semiconductor laser 1 has an emission wavelength ($\lambda$) of 660 nm, and a push-pull method is employed as a tracking servo mechanism. The optical disk 4 has a thickness (t) of 0.6 mm, a track pitch (Tp) of 0.6 $\mu$m (with a land width of 0.6 $\mu$m and a groove width of 0.6 $\mu$m) and a groove depth (d) of $\lambda/8$. Land and groove recording is employed as a recording system.

It is assumed in this example that a system for conveying the optical head 10 (not shown) has a good capability of following information tracks, and thus the objective lens hardly is shifted. Therefore, the symmetry deviation of a tracking error signal due to the objective lens shift in the push-pull method is sufficiently small. The symmetry deviation is such that the positive and negative peak levels of the tracking error signal are different because a DC offset is generated.

Next, a change in a tracking error signal and electric offset correction when the deviation of a light spot peak position occurs will be described with reference to FIGS. 4A, 4B, and 4C. In FIGS. 4A, 4B, and 4C, the horizontal axis represents the distance (the amount of deviation) between a light spot peak position and the center of an information track; and the vertical axis represents a tracking error signal TE (i.e., an output voltage of the signal) provided by the optical head.

FIG. 4A shows the state where no radial tilt occurs. The tracking error signal TE changes to form a substantial sine wave in accordance with the amount of deviation of the light spot peak position from the information track center. When the light spot peak position matches the information track center, the tracking error signal is zero.

When a radial tilt occurs, the shape of a light spot is changed and the phase of a tracking error signal TE deviates as shown in FIG. 4B. In such a case, the tracking error signal TE becomes zero when the light spot peak position deviates by a distance $\delta$ from the information track center. Since tracking servo is controlled so that the tracking error signal TE is zero, the light spot peak position deviates by a distance $\delta$ from the information track center.

FIG. 5 shows the calculation of the amount of deviation between the center of an information track and a light spot peak position caused by the relative radial tilt between the optical disk 4 and the objective lens 3 in the above numerical example. In FIG. 5, the horizontal axis represents the amount of radial tilt (expressed in deg); and the vertical axis represents the amount of deviation (expressed in $\mu$m) of a light spot peak position.

As can be seen from FIG. 5, a linear relationship is established between the amount of deviation of a light spot peak position and that of radial tilt. When a radial tilt is +1.0 deg, the light spot peak position deviates by +0.15 $\mu$m.

FIG. 6 shows measured values of the amount of off-track required to minimize reproduction jitter when a radial tilt occurs in the above numerical example. In FIG. 6, the horizontal axis represents the amount of radial tilt (expressed in deg); and the vertical axis represents the amount of off-track (expressed in $\mu$m) required to minimize reproduction jitter.

As shown in FIG. 6, a substantially linear relationship is established between the amount of radial tilt and that of off-track required to minimize reproduction jitter. When a radial tilt is +1.0 deg, off-track is performed by +0.05 $\mu$m to provide the best reproduction characteristics.

For recording, off-track is necessary to minimize cross erase due to the deviation of a light spot peak position when a radial tilt occurs. FIG. 7 shows measured values of the amount of off-track required to minimize cross erase when a radial tilt occurs in the above numerical example. In FIG. 7, the horizontal axis represents the amount of radial tilt (expressed in deg); and the vertical axis represents the amount of off-track (expressed in $\mu$m) required to minimize cross erase.

As shown in FIG. 7, a substantially linear relationship is established between the amount of radial tilt and that of off-track required to minimize cross erase. When a radial tilt is +1.0 deg, off-track is performed by +0.08 $\mu$m to provide the best recording characteristics.

As described above, the deviation of a light spot peak position due to a radial tilt is corrected by off-track, so that the recording and reproduction characteristics can be improved. However, the amount of deviation of a light spot peak position caused by a radial tilt (see FIG. 5) is not necessarily equal to the amounts of off-track for providing the best recording and reproduction characteristics, respectively (see FIGS. 6 and 7).

The reason for this phenomenon will be described below.

Figure 8A:
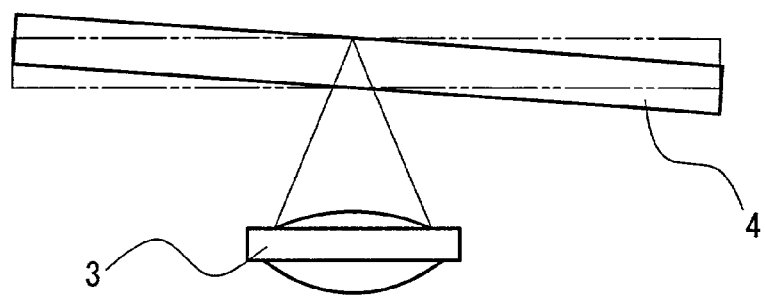
FIG. 8A is a side view in the state where a radial tilt occurs.

FIG. 8A is a side view showing the state of radial tilt, in which the optical disk 4 is inclined relative to the objective lens 3. When a radial tilt occurs, a light spot peak position deviates from the center of an information track, as described above.

Figure 8B:
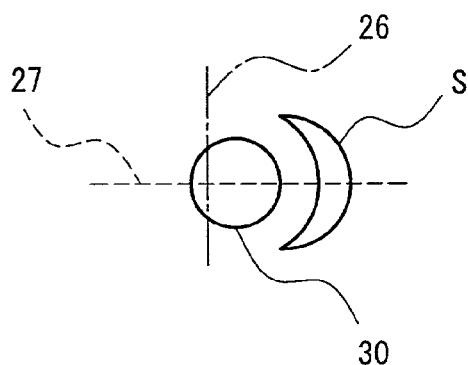
FIG. 8B is a plan view schematically showing the shape of a light spot formed on a recording layer of an optical disk when a radial tilt occurs.
Figure 8C:
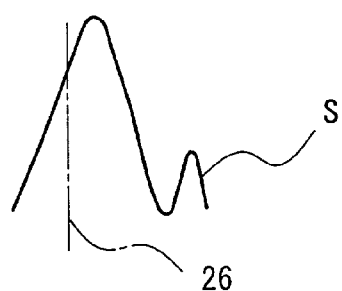
FIG. 8C shows a light intensity distribution curve in the radial direction of the light spot formed on the recording layer of the optical disk when a radial tilt occurs.

FIG. 8B is a plan view schematically showing the shape of a light spot formed on the recording layer 5 of the optical disk 4 when a radial tilt occurs. In FIG. 8B, an alternate long and short dashed line 26 indicates the centerline of an information track. FIG. 8C shows a light intensity distribution curve on a line that goes through the light spot peak position in the radial direction (indicated by a broken line 27 in FIG. 8B).

For the optical system generally used in an optical disk apparatus, the peak position of a light spot 30 deviates from the information track centerline 26, and a side lobe S is generated on one side of the centerline 26 due to coma aberration when a radial tilt occurs, as shown in FIG. 8B. Consequently, the light intensity distribution becomes asymmetric with respect to the centerline 26, as shown in FIG. 8C.

Because of such asymmetry in the light intensity distribution when a radial tilt occurs, even if the peak position of the light spot 30 is corrected (off-track) so as to match the information track centerline 26, the correction affects asymmetrically the adjacent tracks located inside and outside of the light spot.

This will be described in detail with reference to FIGS. 9A and 9B.

FIG. 9A schematically shows the relationship between information tracks and the light intensity distribution of a light spot before performing correction (off-track) such that the peak position of a light spot matches the information track centerline 26 when a radial tilt occurs. In this case, the radial tilt causes the light spot peak position (at which the intensity distribution curve has its peak) to deviate by a distance δ from the centerline 26 on the side where the side lobe S is generated.

When the light spot peak position (at which the intensity distribution curve has its peak) is corrected (off-track) so as to match the centerline 26, experiments have shown that cross talk and cross erase are increased more in the adjacent track B, where the side lobe S is not generated, than in the adjacent track A, where the side lobe S is generated. In other words, the correction (off-track) as shown in FIG. 9B is over-correction.

The present invention performs correction (off-track) in the direction that eliminates the deviation of a light spot peak position caused by a radial tilt. Therefore, it is preferable that the amount of off-track is smaller than the amount of deviation δ of a light spot peak position actually caused by a radial tilt, and that the light spot peak position is corrected so as to shift slightly to the side where the side lobe S is generated with respect to the information track centerline 26. This correction can optimize the recording and reproduction characteristics. Moreover, the degree of influence of asymmetry in the light intensity distribution due to a radial tilt differs in cross talk (reproduction characteristics) and cross erase (recording characteristics). Therefore, the amount of off-track (i.e., the amount of correction) required to provide the best characteristics differs depending on reproduction and recording.

Next, consideration is given to variations in each parameter of an optical disk.

The optical disk variations can result from variations in reflectivity, groove width, and groove depth. The shape of a tracking error signal or the like is changed according to each of them.

First, the reflectivity variation will be explained. When reflectivity changes, only the amplitude of a tracking error signal is changed in proportion to a change in the reflectivity, and the shape thereof is not changed. In other words, the variation in phase deviation of a tracking error signal is not caused even if the reflectivity varies. Thus, the amount of deviation between the center of an information track and a light spot peak position is constant.

Next, the groove width variation will be explained by referring to FIG. 10.

Figure 10:
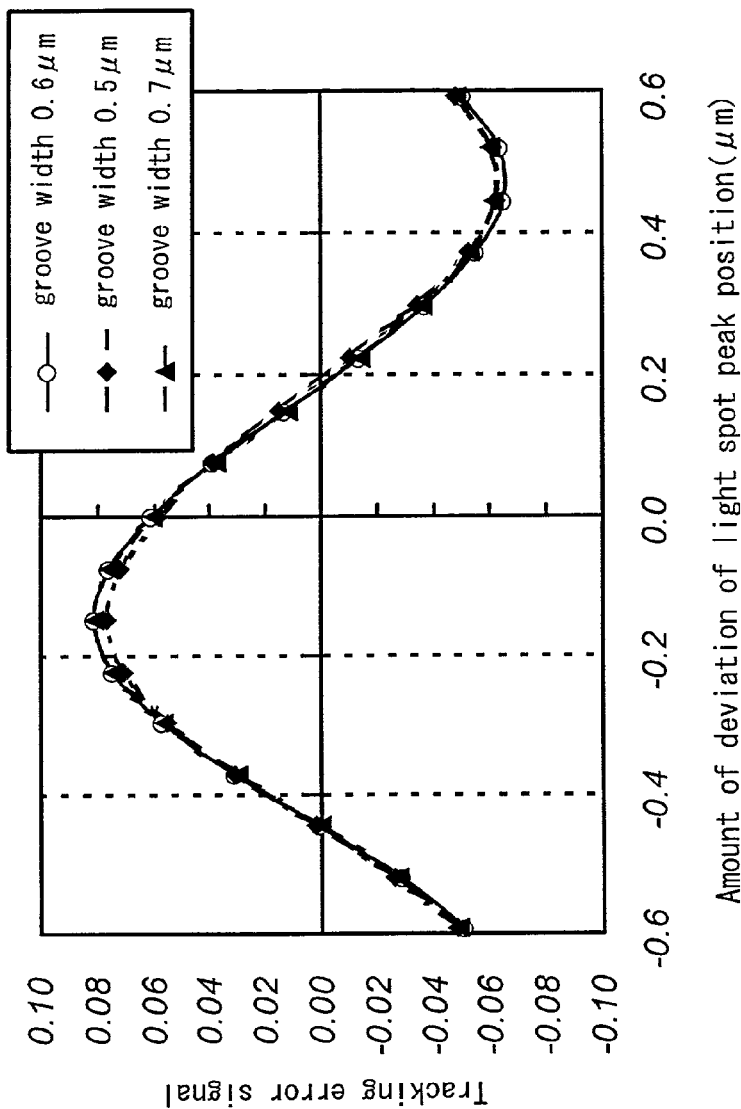
FIG. 10 shows the change of a tracking error signal in the case of a radial tilt according to a change in the groove width of an optical disk in an embodiment of the present invention.

In FIG. 10, the horizontal axis represents the amount of deviation (expressed in μm) of a light spot peak position from the center of an information track (whose coordinate is zero); and the vertical axis represents the output of a tracking error signal (the unit is not specified). FIG. 10 shows the calculation of tracking error signal waveforms at a radial tilt of 1.0 deg when the groove width (with a groove width of 0.6 μm and a land width of 0.6 μm) of the optical disk in the above numerical example changes to that with a groove width of 0.5 μm and a land width of 0.7 μm and to that with a groove width of 0.7 μm and a land width of 0.5 μm.

As shown in FIG. 10, the phase of a tracking error signal is not changed even if the groove width changes. Thus, the amount of deviation between the light spot peak position at which the tracking error signal is zero and the information track center is constant (0.18 μm).

Finally, the groove depth variation will be explained by referring to FIGS. 11 and 12. In each of FIGS. 11 and 12, the horizontal axis represents the amount of deviation (expressed in μm) of a light spot peak position from the center of an information track (whose coordinate is zero); and the vertical axis represents the output of a tracking error signal (the unit is not specified).

Figure 11:
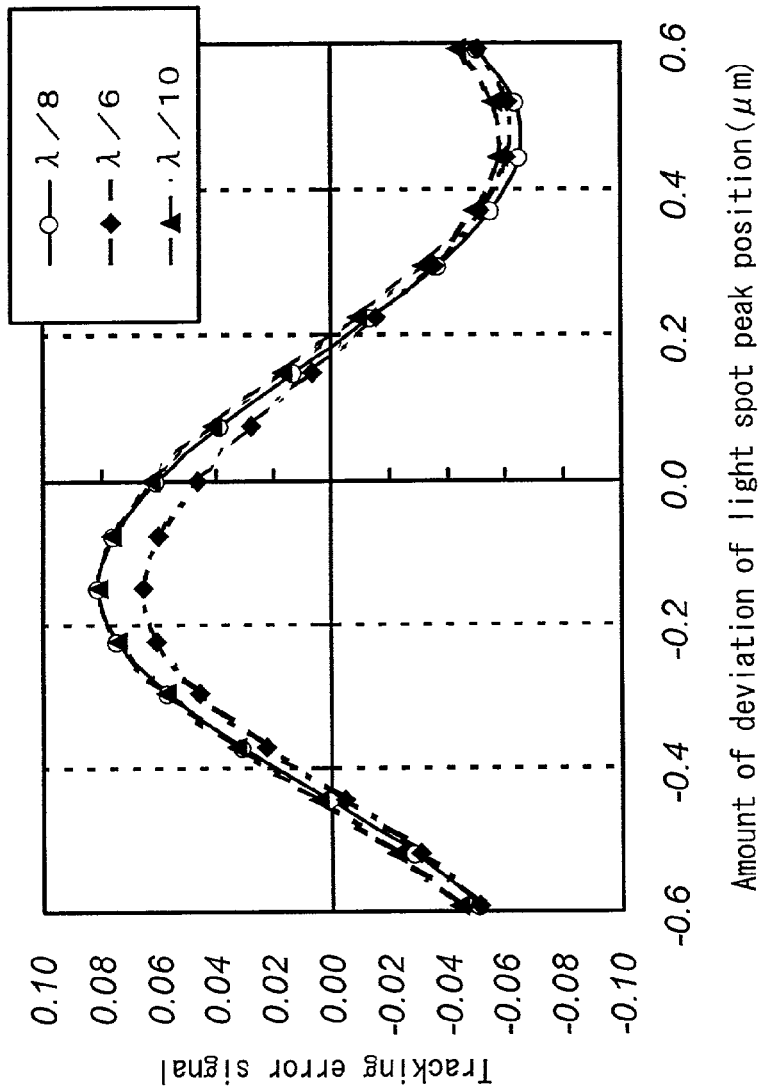
FIG. 11 shows the change of a tracking error signal in the case of a radial tilt according to a change in the groove depth of an optical disk in an embodiment of the present invention.
Figure 12:
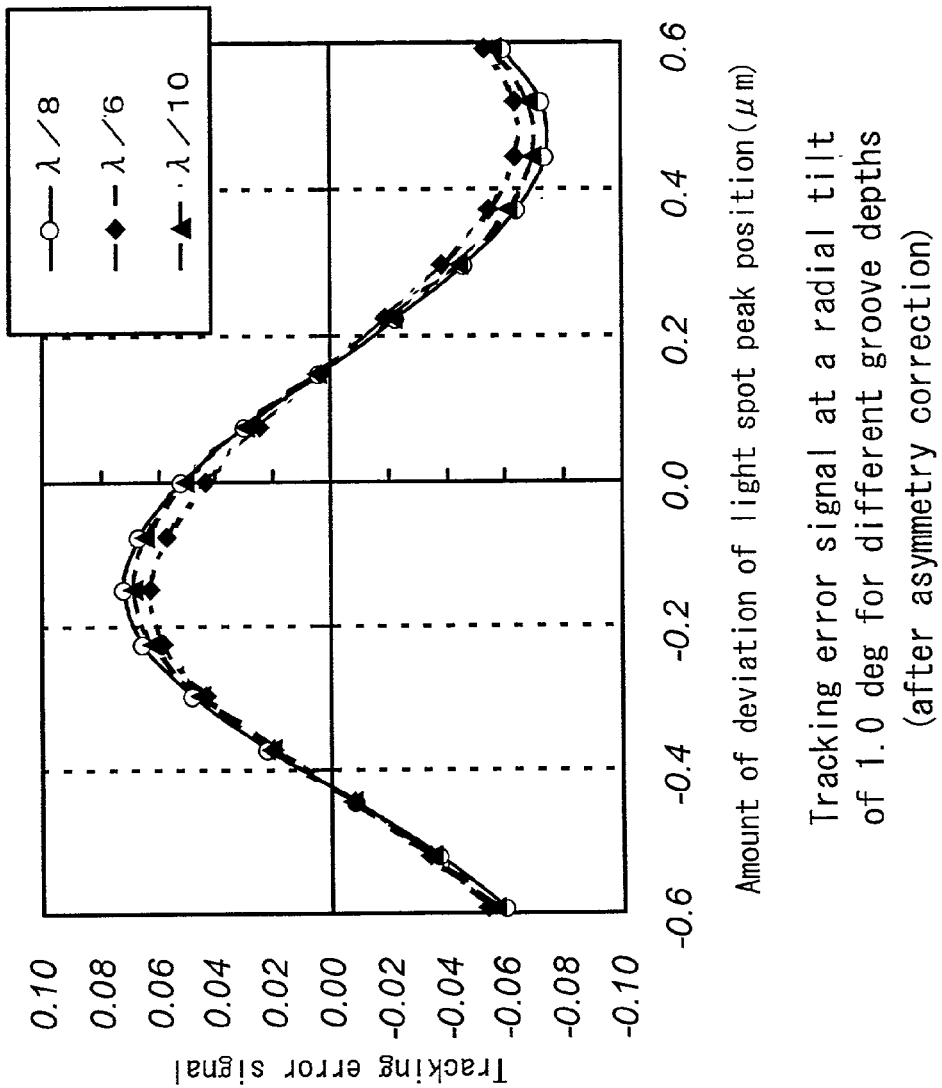
FIG. 12 shows the change of a tracking error signal after asymmetry correction in the case of a radial tilt according to a change in the groove depth of an optical disk in an embodiment of the present invention.

FIG. 11 shows the calculation of tracking error signal waveforms at a radial tilt of 1.0 deg when the groove depth (λ/8) of the optical disk in the above numerical example changes to λ/6 and λ/10.

As shown in FIG. 11, the groove depth variation causes a change in the amplitude and symmetry of a tracking error signal (i.e., the positive and negative peak levels of the tracking error signal are different because a DC offset is generated). This results in variation in the amount of deviation between the light spot peak position at which the tracking error signal is zero and the information track center.

In the push-pull method, which is the tracking servo mechanism of the above numerical example, the objective lens shift is sufficiently small. Therefore, the change of symmetry described above is caused by a radial tilt. Since the symmetry of a tracking error signal is unchanged during recording and reproducing operations, the change of symmetry can be corrected in such a manner that the asymmetric tracking error signal due to the radial tilt and groove depth variation is shifted by electrically applying a DC offset. FIG. 12 shows tracking error signal waveforms after the asymmetry of the tracking error signal at a radial tilt of 1.0 deg in FIG. 11 is corrected by application of an electric offset. As a result of the asymmetry correction in FIG. 12, the amount of deviation between the light spot peak position at which the tracking error signal is zero and the information track center becomes constant (0.18 μm) regardless of the groove depth variation.

As described above, the asymmetry of a tracking error signal is corrected by application of an electric offset. Therefore, even if the optical disk variations occur, the amount of deviation between the center of an information track and the peak position of a light spot is always constant, so that the amount of off-track for improving the recording and reproduction characteristics is unchanged. This makes it possible to improve the recording and reproduction characteristics by applying the predetermined amount of off-track regardless of the optical disk variations.

Next, a specific method in which an electric offset is applied to a tracking error signal to cause off-track will be explained. As described above, when the shape of a light spot is changed by a radial tilt, the phase of a tracking error signal TE deviates as shown in FIG. 4B. The tracking error signal TE becomes zero when the light spot peak position deviates by a distance δ from the center of an information track. Since tracking servo is controlled so that the tracking error signal TE is zero, the light spot peak position deviates by a distance δ from the information track center if correction is not made.

Thus, the tracking error signal is corrected by applying an electric offset Voft thereto, so that the zero-cross point of the tracking error signal (i.e., the light spot peak position at which the tracking error signal TE is zero) can match the track center, as shown in FIG. 4C. In FIG. 4C, an alternate long and two short dashed line indicates a tracking error signal TE before correction (i.e., the signal curve in FIG. 4B).

The tracking error signal can be approximated with a sine wave. Therefore, the relationship between an electric offset Voft (mV) and the amount of off-track x (μm) is expressed by $$Voft = (Vte/2) \times \sin(2\pi x/2Tp) \qquad \text{Equation 1}$$

where Vte is the tracking error signal amplitude and Tp is the track pitch of an optical disk.

Figure 13:
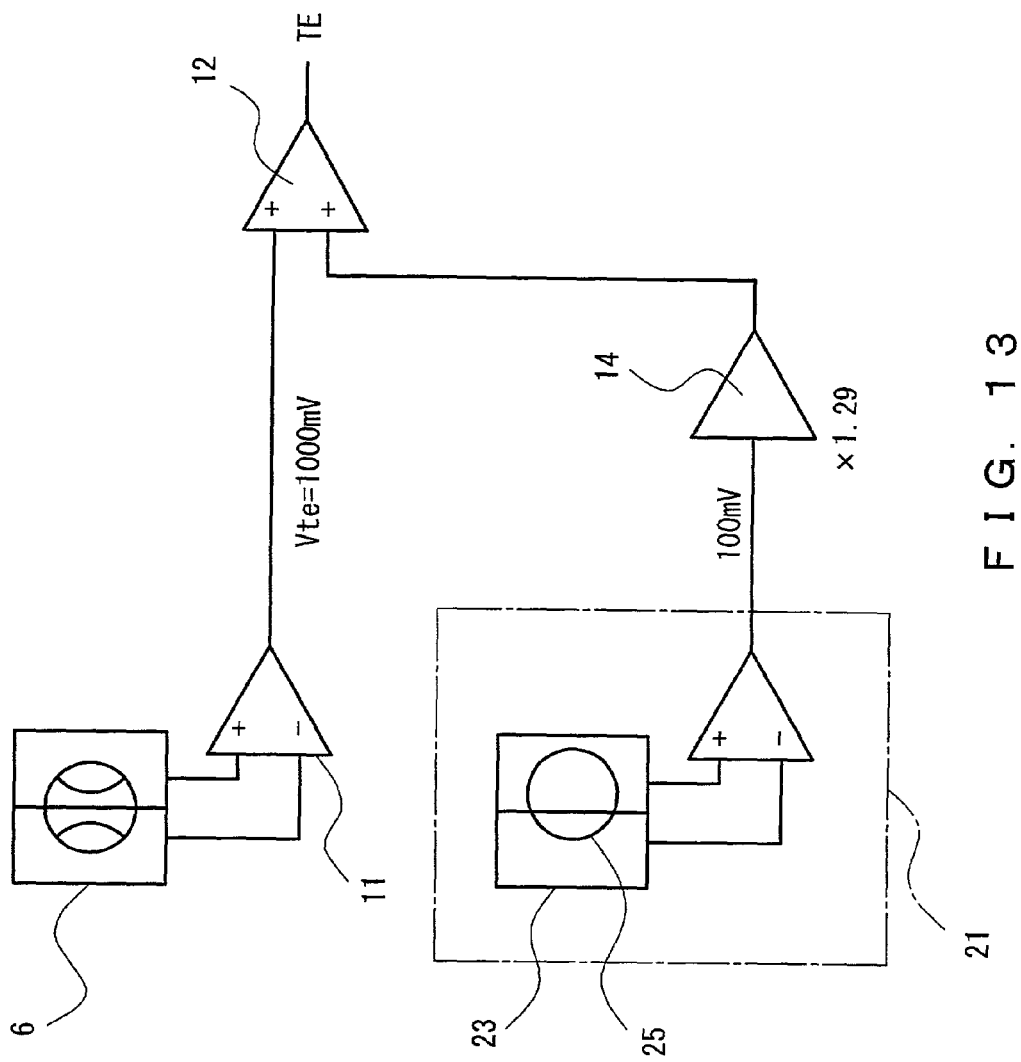
FIG. 13 is a block diagram showing a specific method for off-track correction in an embodiment of the present invention.
Figure 15:
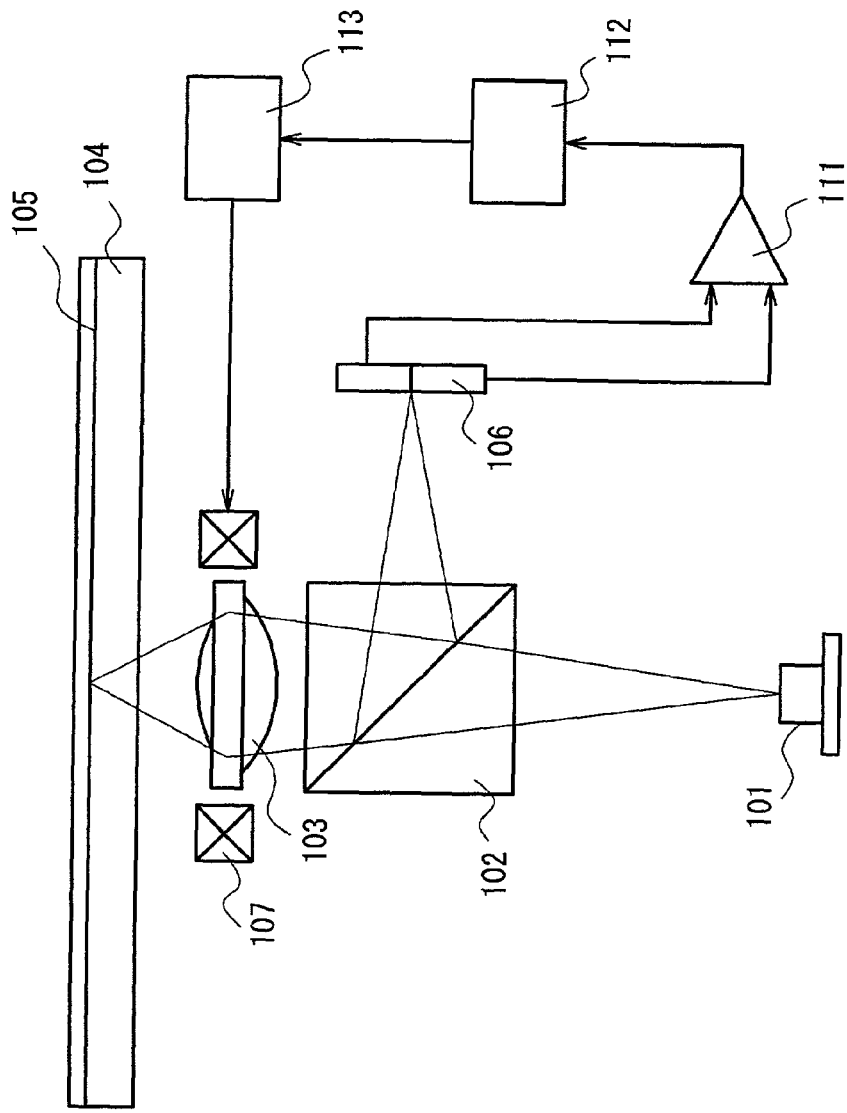
FIG. 15 shows the schematic configuration of a conventional information recording/reproducing apparatus.
Figure 16:
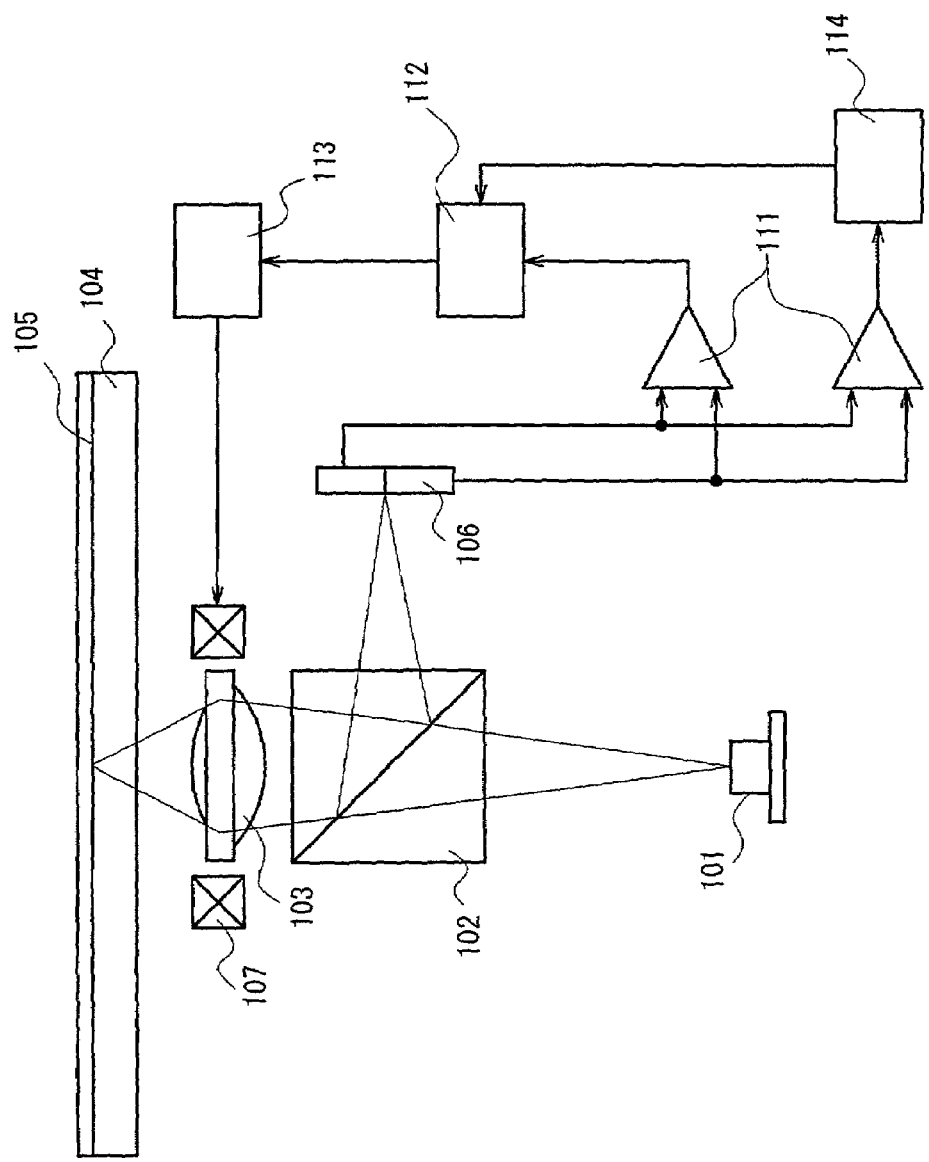
FIG. 16 shows the schematic configuration of another conventional information recording/reproducing apparatus.

FIG. 13 is a block diagram for off-track correction in the above numerical example. For instance, the amplitude Vte of a tracking error signal output from the photodetector 6 is given by Vte=1000 mV. As described above, the amount of off-track x needed for providing the best reproduction characteristics at a radial tilt of +1.0 deg in the numerical example is +0.05 μm (see FIG. 6). The electric offset Voft required to perform such off-track is +129 mV, which is determined by Equation 1. When the tilt detecting portion 21 outputs +100 mV at a radial tilt of +1.0 deg, the arithmetic circuit 14 multiplies the output voltage of +100 mV by a gain of 1.29 (to give +129 mV). Then, the offset application circuit 12 adds the output voltage of the arithmetic circuit 14 to the tracking error signal as an electric offset. Consequently, the desired amount of off-track x=+0.05 μm is applied to the light spot peak position, and thus the reproduction characteristics can be optimized.

On the other hand, the output of the semiconductor laser 1 for recording is larger than that for reproduction. Therefore, the amount of light reflected from the optical disk into the photodetector 6 is increased, which leads to an increase in the tracking error signal amplitude Vte. In general, however, the values of the amplitude Vte during recording and reproduction are made constant with a method called AGC (automatic gain control). Thus, Vte=1000 mV also can be used as the tracking error signal amplitude Vte for recording.

As described above, the amount of off-track x needed for providing the best recording characteristics at a radial tilt of +1.0 deg in the numerical example is +0.08 μm (see FIG. 7). The electric offset Voft required to perform such off-track is +200 mV, which is determined by Equation 1. Thus, the recording characteristics can be optimized in the following manner: the arithmetic circuit 14 multiplies an output voltage of +100 mV from the tilt detecting portion 21 at a radial tilt of +1.0 deg by a gain of 2.0 (to give +200 mV); the offset application circuit 12 adds the output voltage of the arithmetic circuit 14 to the tracking error signal as an electric offset; and the desired amount of off-track x=+0.08 μm is applied to the light spot peak position.

The electric offset Voft in Equation 1 is proportional substantially to the amount of off-track x within the range of x<±0.2 μm. Therefore, when there is a linear relationship between the output voltage from the tilt detecting portion 21 and the amount of radial tilt, the best reproduction and recording characteristics always can be obtained by off-track with a single gain.

Alternatively, a gain by which the output voltage from the tilt detecting portion 21 is multiplied is switched depending on reproduction and recording. This allows the amount of off-track to be switched between reproduction and recording, so that each of the reproduction and recording characteristics can be made best. It is possible to distinguish between the reproducing and recording states by monitoring another circuit for switching the power of the semiconductor laser 1.

When the amount of off-track for providing the best recording and/or reproduction characteristics differs in lands and grooves of the optical disk, individual gains are set previously to each of lands and grooves, and the polarity of tracking servo is monitored to distinguish between the lands and the grooves. Those gains are switched based on the distinction, thereby providing the best recording/reproduction characteristics under each condition.

When the variations in an optical disk occur, the tracking error signal amplitude Vte is changed. However, the amount of off-track x is determined by the ratio of an electric offset Voft to the tracking error signal amplitude Vte. Therefore, an output signal from the tilt detecting portion 21 is corrected so that the ratio of the output signal to the tracking error signal amplitude Vte is constant. As a result, the amount of off-track x that is always constant can be obtained regardless of variations in each parameter of the optical disk, such as the variations in reflectivity, groove width, groove depth, or the like.

When the amount of radial tilt is in a predetermined range, i.e., only when the output voltage from the tilt detecting portion 21 is in the predetermined range, the recording and reproduction characteristics can be improved with a simple circuit structure by applying a predetermined electric offset to a tracking error signal for performing off-track. This will be explained by referring to FIG. 14.

In FIG. 14, the horizontal axis represents the amount of radial tilt (expressed in deg); and the vertical axis represents the residual deviation of a light spot position by off-track (expressed in μm). The broken line represents the amount of deviation of a light spot position before applying off-track.

For reproduction, e.g., when an output voltage from the tilt detecting portion 21 is +30 mV or more (i.e., the amount of radial tilt is +0.3 deg or more), an off-track A of +0.1 μm (i.e., an electric offset of +250 mV) is applied and when the output voltage is −30 mV or less (i.e., the amount of radial tilt is −0.3 deg or less), an off-track B of −0.1 μm (i.e., an electric offset of −250 mV) is applied, as shown in FIG. 14. Consequently, the amount of residual deviation between an information track and a light spot peak position can be always ±0.05 μm or less when the amount of radial tilt ranges from −1.0 deg to +1.0 deg.

In the case where the amount of off-track is not optimum for recording, this may cause cross erase. The present invention does not rely on the optical disk variations, as described above. Actually, however, the deviation of a light spot peak position may be caused by the variation in performance of a drive or optical head itself.

To prevent this, it is preferable to ascertain the presence or absence of cross erase beforehand by so-called "trial recording" on a predetermined region of an optical disk under off-track correction according to the procedure described in this embodiment. When the cross erase is found, further off-track correction is performed to provide the optimum amount of off-track for recording. In such a case, since the off-track correction of the present invention has been performed, the additional off-track correction can be minimized.

As described above, the present invention allows a light spot position to be off-track by applying an electric offset to a tracking error signal, the electric offset being obtained by multiplying an electric signal output from the tilt detection portion in accordance with the amount of radial tilt by a predetermined constant. In this manner, the recording and reproduction characteristics can be improved. Moreover, the present invention corrects the amount of electric offset so that the ratio of the electric offset to the tracking error signal amplitude is constant, in addition to asymmetry correction of the tracking error signal. As a result, the constant amount of off-track is provided regardless of the optical disk variations, thereby improving the recording and reproduction characteristics that are always stable. Further, the application of different electric offsets for recording and reproduction or lands and grooves can provide the best recording/reproduction characteristics for recording and reproduction or lands and grooves.

In the explanation of the above numerical example, the push-pull method is used as a tracking servo mechanism.

However, the present invention also can be applied, e.g., to a sample servo method or 3 beam method, which utilizes a difference in the amount of reflected light in the radial direction of an optical disk, because the deviation of a light spot peak position due to a radial tilt is caused in those methods. As a result, the recording and reproduction characteristics can be improved.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information recording/reproducing apparatus comprising:
    a light source;
    a focusing optical system for focusing light emitted from the light source on an information recording medium as a light spot;
    an error signal generation system for generating an error signal that represents a positional deviation between an information track and the light spot on the information recording medium by converting light reflected from the information recording medium into an electric signal;
    a control system for controlling the light spot to follow the information track by using the error signal;
    a tilt measurement system for measuring a relative inclination between the information recording medium and the focusing optical system; and
    an offset application system for shifting the light spot with respect to the information track in accordance with a signal from the tilt measurement system;
    wherein the offset application system generates an electronic offset by multiplying an electric signal from the tilt measurement system that corresponds to the relative inclination between the information recording medium and the focusing optical system by a predetermined constant, and shifts the light spot with respect to the information track by applying the electric offset to the error signal.

2. The information recording/reproducing apparatus according to claim 1, wherein an amount of shift of the light spot by the offset application system is smaller than that of the positional deviation between the information track and the light spot caused by the relative inclination between the information recording medium and the focusing optical system.

3. An information recording/reproducing apparatus comprising:
    a light source;
    a focusing optical system for focusing light emitted from the light source on an information recording medium as a light spot;
    an error signal generation system for generating an error signal that represents a positional deviation between an information track and the light spot on the information recording medium by converting light reflected from the information recording medium into an electric signal;
    a control system for controlling the light spot to follow the information track by using the error signal;
    a tilt measurement system for measuring a relative inclination between the information recording medium and the focusing optical system; and
    an offset application system for shifting the light spot with respect to the information track in accordance with a signal from the tilt measurement system;
    wherein the offset application system selects any of a plurality of predetermined electric offsets in accordance with an electric signal from the tilt measurement system that corresponds to the relative inclination between the information recording medium and the focusing optical system, and shifts the light spot with respect to the information track by applying the selected electric offset to the error signal, and
    the offset application system corrects variations in the information recording medium by measuring an amplitude of the error signal and correcting the signal from the tilt measurement system so that a ratio of the signal from the tilt measurement system to the amplitude of the error signal is constant.

4. The information recording/reproducing apparatus according to claim 1, wherein the offset application system corrects variations in the information recording medium by measuring an amplitude of the error signal and correcting the signal from the tilt measurement system so that a ratio of the signal from the tilt measurement system to the amplitude of the error signal is constant.

5. The information recording/reproducing apparatus according to claim 4, wherein the offset application system corrects groove depth variation of the information recording medium by correcting asymmetry of the error signal by application of an electric offset corresponding to the asymmetry to the error signal.

6. The information recording/reproducing apparatus according to claim 1, wherein the offset application system distinguishes between reproducing and recording operations on the information recording medium, and changes an amount of shift of the light spot with respect to the information track based on the distinction.

7. The information recording/reproducing apparatus according to claim 1, wherein the offset application system distinguishes between a reproducing operation for lands of the information recording medium and that for grooves thereof, and changes an amount of shift of the light spot with respect to the information track based on the distinction.

8. The information recording/reproducing apparatus according to claim 1, wherein the offset application system distinguishes between a recording operation for lands of the information recording medium and that for grooves thereof, and changes an amount of shift of the light spot with respect to the information track based on the distinction.

9. The information recording/reproducing apparatus according to claim 3, wherein an amount of shift of the light spot by the offset application system is smaller than that of the positional deviation between the information track and the light spot caused by the relative inclination between the information recording medium and the focusing optical system.

10. The information recording/reproducing apparatus according to claim 3, wherein the offset application system corrects groove depth variation of the information recording medium by correcting asymmetry of the error signal by application of an electric offset corresponding to the asymmetry to the error signal.

11. The information recording/reproducing apparatus according to claim 3, wherein the offset application system distinguishes between reproducing and recording operations on the information recording medium, and changes an amount of shift of the light spot with respect to the information track based on the distinction.

12. The information recording/reproducing apparatus according to claim 3, wherein the offset application system distinguishes between a reproducing operation for lands of the information recording medium and tat for grooves thereof, and changes an amount of shift of the light spot wit respect to the information track based on the distinction.

13. The information recording/reproducing apparatus according to claim 3, wherein the offset application system distinguishes between a recording operation for lands of the information recording medium and that for grooves thereof, and changes an amount of shift of the light spot with respect to the information track based on the distinction.

* * * * *

UNITED STATES PATENT AND TRADEMARK OFFICE
CERTIFICATE OF CORRECTION

PATENT NO. : 6,970,404 B2  
DATED : November 29, 2005  
INVENTOR(S) : Yamasaki et al.

It is certified that error appears in the above-identified patent and that said Letters Patent is hereby corrected as shown below:

<u>Column 13,</u>
Line 27, "by convening light" should read -- by converting light --.

<u>Column 15,</u>
Line 10, "and tat for grooves" should read -- and that for grooves --.

<u>Column 16,</u>
Line 1, "wit respect to" should read -- with respect to --.

Signed and Sealed this

Sixth Day of June, 2006

JON W. DUDAS
*Director of the United States Patent and Trademark Office*